Figure 1:
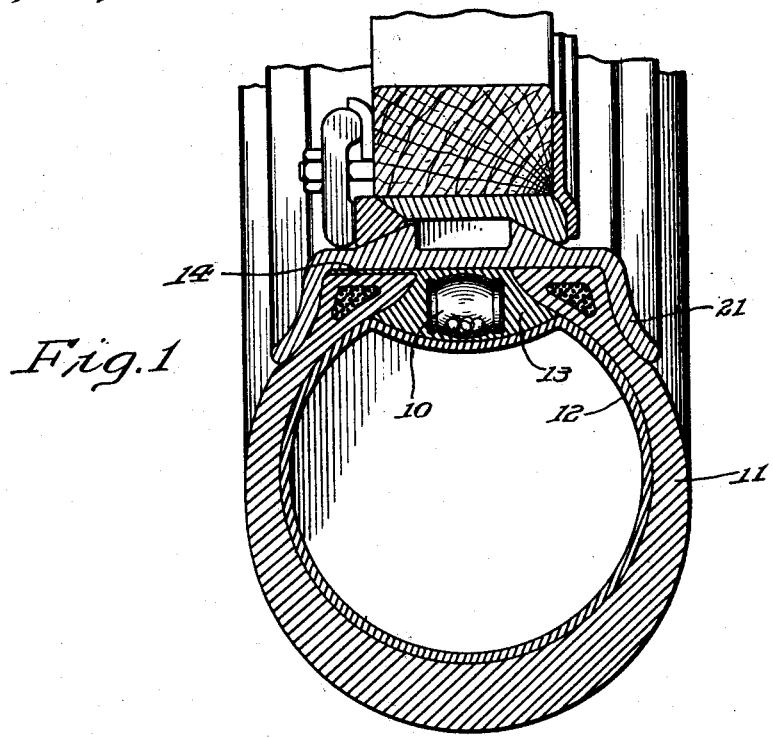

J. W. & R. A. WATSON.
MILEAGE INDICATOR FOR TIRES.
APPLICATION FILED JAN. 24, 1918.

1,292,179.

Patented Jan. 21, 1919.

WITNESS
F. J. Hartman.

INVENTORS
John Warren Watson,
Richard Adlai Watson.
BY
Fenton & Blount,
ATTORNEYS

UNITED STATES PATENT OFFICE.

JOHN WARREN WATSON AND RICHARD ADLAI WATSON, OF WAYNE, PENNSYLVANIA.

MILEAGE-INDICATOR FOR TIRES.

1,292,179. Specification of Letters Patent. Patented Jan. 21, 1919.

Application filed January 24, 1918. Serial No. 213,455.

*To all whom it may concern:*

Be it known that we, JOHN WARREN WATSON and RICHARD ADLAI WATSON, citizens of the United States, and residents of Wayne, in the county of Delaware and State of Pennsylvania, have invented certain new and useful Improvements in Mileage-Indicators for Tires, of which the following is a specification.

This invention relates to mileage indicators for vehicle tires and has for its object to provide a practical and dependable mechanism of the character indicated, contemplating broadly means to indicate the extent of tire travel by utilizing the relative movement of certain elements, said relative movement being caused by, and being uninterrupted or unobstructed to take place in whatever manner may be dictated by, the various forces or combination of forces coincident with the prolate cycloidal movement of the mechanism when attached to a tire in use.

While we herewith describe in detail one form of mechanism for utilizing unobstructed relative movement of two or more elements in such manner as such movement may be dictated by the forces as above referred to, to indicate tire mileage, we do not wish to limit ourselves to the utilization of this unobstructed relative movement, caused by these forces, in the specific manner as shown and described herewith in which the movement is utilized to cause wear.

In the drawings forming a part of this specification, there is illustrated one form of mechanism for carrying this invention into practice, but it is to be understood that the particular form illustrated is not necessarily essential to the invention and many alterations and modifications thereof may be readily made without departing from the spirit and scope of the invention.

Figure 2:
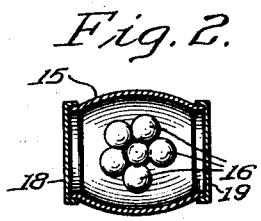
Figure 3:
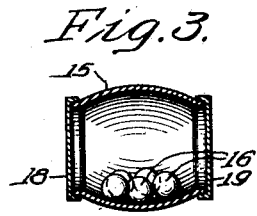
Figure 4:

Figure 1 is a cross-sectional view of a tire and part of a wheel showing one embodiment of our invention positioned therein by one form of means; Figs. 2 and 3 are longitudinal sectional views of the embodiment chosen to illustrate the invention detached from the tire, while Fig. 4 is a cross-sectional view thereof.

In the construction illustrated, one embodiment of the invention is shown in the indicator device 10 as applied to a pneumatic tire 11 provided with an inner tube 12. It is, of course, evident that the mechanism could be used with various forms of either pneumatic or solid tires all of various constructions and this invention is equally applicable to all forms. Furthermore, any means could be employed for securing the indicator 10 in operative position with respect to the tire, the form illustrated consisting of a body of suitable material 13, such as rubber for example, adapted to surround and inclose or otherwise secure or cement the indicator 10 in position in the tire. Thus, the material 13 may be vulcanized to the casing 11, and, if desired, a portion of the material 13 may be extended as at 14 over a portion of the inner periphery of the casing 11 to more securely position the indicator 10 in proper operative position with relation to the tire 11 whose extent of use it is desired to indicate.

The embodiment of the invention herein disclosed comprises a member 15 fixed with relation to the tire and which provides a runway or raceway for the spherical members 16. The open ends of member 15 are closed by caps 18 and 19.

The runway member 15 is constructed of a material sufficiently hard so that wear of this member, due to the movement of members 16 thereon, is negligible.

The members 16 are constructed of a material sufficiently soft so that their movement in the raceway 15, as such movement may be caused by the forces above referred to, will result in sufficient wear thereof, as this movement continues, to provide an adequate indication of tire mileage as the use of the tire is continued.

It will be seen from the above that the runway 15 is so constructed as to in no way obstruct the movement of the members 16 in whatever manner this movement may be dictated by the forces of gravity, acceleration, retardation and whatever other forces or combination of forces are active upon the members 16 when said device is attached to a tire in use.

While we have herein described one means for carrying this invention into practice by means of wear as a result of the unobstructed relative movement of members caused by the operation of the forces as indicated, we do not desire or intend to limit ourselves to the mechanism disclosed since it is self-evident that various means and instrumentalities can be readily used to accomplish the ends intended and that various and many alterations and modifications of the device can be readily made without departing from the fundaments of the disclosure.

If the runway 15 were so formed as to offer obstructions to the movement of the members 16 therein, say, for example, a runway having abutments or ends, it is easily possible that at certain speeds the combination of the forces of gravity, acceleration, retardation and whatever other forces might become active, might resolve themselves into a force which would drive the members 16 against one of the abutments or ends of the runway and hold them there. This, of course, would prevent the members 16 from moving and wearing at such tire speeds and would therefore defeat the very purpose of the device. With the unobstructed form of runway, as here disclosed, such a condition of stoppage would be impossible, as the members 16 are at all times and at all speeds free to move in any direction which the above forces or combination of forces may dictate. The advantage of thus providing an unobstructed form of runway for the members 16 is twofold; first, to eliminate any possibility of the members 16 being flattened by impact which would prevent their operation thereafter, being exactly as it was before, and second, to insure unblocked movement of the members 16 regardless of whatever combination the various forces might resolve themselves into at any specific speed or speeds of tire travel.

In the device disclosed, we have provided a tire mileage indicator which can be manufactured in large quantities at low cost and in which the number of variables is so reduced as to make possible a degree of uniformity in these indicators, one with another, which will render them commercially valuable. In our invention, as will be understood from the accompanying drawings and the foregoing specification, the variable has been reduced to one factor, namely:—the uniform hardness or wearing ability of the members 16. The runway is made of a material sufficiently harder than the members 16 themselves that slight variations in the hardness of this runway material will have no appreciable effect on the wear of the members 16. Further assurance of uniformity, one instrument with another, is provided for by employing a plurality of members 16 instead of just one. While one member 16 in a certain indicator may be a little under standard in hardness, the chances are similarly equal that one of the other members 16 in the same indicator will be a little over standard and the total result in the great average of cases, will therefore be very close to being correct, at any rate sufficiently close for all practical purposes.

If but one member 16 was employed, the amount of wear, due to the fact that a rolling contact produces very little friction, might possibly be too slight to produce an adequate indication of tire mileage in small units thereof. By employing a plurality of members 16, the wear becomes more marked due to the friction set up by the sliding and rubbing action of one member 16 against another as they roll or move along together on the runway, thus making sure the production of sufficient wear to indicate sufficiently small units of tire travel.

Various methods of converting the wear of the members 16 into a means for ascertaining the extent of tire travel may be used, such as, for example, by measuring the decreased weight of the members, or by measuring their decreased size, or by measuring the amount of liquid their decreased size will displace, or by any other suitable means.

Having thus described our invention, we claim and desire to protect by Letters Patent of the United States:

1. A mileage indicator for tires including relatively movable members so associated as to have no obstruction presented to their relative movement in any manner as dictated by the forces operative thereon coincident with the prolate cycloidal movement of the device during tire use.

2. The combination with a vehicle tire, of means carried thereby, including relatively movable members, one controlled by the other and adapted to be otherwise unrestrictedly moved by the forces generated by the movement of the device when attached to a tire during use to thereby afford an indication of the extent of tire travel.

3. In combination with a vehicle tire, of means for indicating the extent of tire travel including a member in fixed relation to said tire and a member movable relatively thereto, said members being arranged to permit the free operation of the forces present during the motion of a tire in use to effect a wear of one of said members and thereby form a means to indicate the extent of tire travel.

4. In a tire mileage indicator, means for indicating the extent of tire travel, said means including a casing adapted to be fixed with relation to the tire, an element within the casing and relatively movable with respect thereto and means for permitting unobstructed movement of the element with relation to the casing while the tire is in use, such movement causing the element to wear and thereby provide a means to ascertain the extent of tire use.

5. In a tire mileage indicator, means for causing wear of an element to indicate the extent of tire travel, including a member fixed with relation to the tire and forming a runway, an element relatively movable with respect thereto and means permitting unobstructed travel thereof in any direction within the member as dictated by the forces due to the motion of the device on a tire in use.

6. In a mileage indicator for tires, means for indicating the extent of tire travel including a member adapted to be fixed with relation to the tire and a member adapted to be moved relatively thereto, said members being arranged to permit the free operation of the forces resulting from a movement of the device on a tire to effect an unobstructed relative movement between said members and cause a wear of one of said members and thereby form a means to indicate the extent of tire travel.

7. In combination with a vehicle tire, of means to indicate the extent of tire travel, said means including a retainer fixed with relation to the tire, an element within said retainer and relatively movable thereto, said retainer being of such form as to cause no interruption to the movement of the element within the casing, as dictated by the forces thereon coincident with the prolate cycloidal movement of the retainer during tire use.

8. In a tire mileage indicator, means for causing wear to indicate the extent of tire travel, said means including a wearing element and a retainer for the same so constructed as to provide for the element a continuous runway in the plane of its motion.

9. In combination with a vehicle tire, of means to indicate the distance traveled by the tire, said means including a retainer fixed with relation to the tire and an element within said retainer free to move with relation thereto and free to move in a curved path, all points of which are equidistant from a given point within the retainer.

10. In combination with a vehicle tire, of means for indicating the distance traveled by the tire, said means comprising a casing in fixed relation with the tire and a plurality of elements within said casing and of relatively softer material than the casing, the casing being of such form as to cause no interruption to the travel of the elements within the casing and with relation thereto, as dictated by the forces of gravity, acceleration and retardation coincident with the prolate cycloidal movement of the casing during tire use.

11. In combination with a vehicle tire, of means for causing wear of an element to indicate the extent of tire travel, said means including a member fixed with relation to the tire and movable with relation to the element and forming a runway for the element which will cause no interruption to the travel of the element in any direction within and with relation to the member during tire use.

12. In a tire mileage indicator, the combination of a casing and an element within said casing and relatively movable thereto, said casing being of such form as to offer no obstruction to the movement of the element therewithin, as may be dictated by the forces coincident with the prolate cycloidal movement of the casing during tire use.

13. In a tire mileage indicator, means for causing wear of an element to indicate the extent of tire travel, said means including a member fixed with relation to the tire and forming a runway for the element which will cause no obstruction to the travel thereof in any direction with relation to the member dictated by the forces generated as a result of movement of the device when attached to a tire in use.

14. In a tire mileage indicator, an element, means for causing wear of the element to thereby provide indication of the extent of tire use, said means including a member to be fixed to a tire and forming a continuing bowl-shaped runway for the element.

15. In a tire mileage indicator, the combination of relatively movable and contacting parts so formed and associated as to permit their relative movement to take place unobstructedly in whatever manner may be dictated by the forces active thereon when the indicator is fixed to a tire in use.

16. In a tire mileage indicator, the combination of relatively movable and contacting parts so formed and associated as to permit their relative movement in any amount dictated by the forces coincident with the prolate cycloidal movement of the indicator during the use of the tire to which it is attached.

In witness whereof we have hereunto set our hands this 22nd day of January, A. D. 1918.

JOHN WARREN WATSON.
RICHARD ADLAI WATSON.

Copies of this patent may be obtained for five cents each, by addressing the "Commissioner of Patents, Washington, D. C."